United States Patent
Zhang et al.

(10) Patent No.: US 9,683,078 B2
(45) Date of Patent: Jun. 20, 2017

(54) METHOD FOR PREPARING BRANCHED POLYCARBONATE WITH CONTINUOUS TWO-PHASE INTERFACE PHOSGENE METHOD

(71) Applicant: Wanhua Chemical Group Co., Ltd., Yantai (CN)

(72) Inventors: Lei Zhang, Yantai (CN); Zhikun Gao, Yantai (CN); Zhansen Xiong, Yantai (CN); Hongke Zhang, Yantai (CN); Qin Tian, Yantai (CN); Weiqi Hua, Yantai (CN)

(73) Assignee: Wanhua Chemical Group Co., Ltd. (CN)

( * ) Notice: Subject to any disclaimer, the term of this patent is extended or adjusted under 35 U.S.C. 154(b) by 0 days.

(21) Appl. No.: 14/914,492

(22) PCT Filed: Sep. 9, 2013

(86) PCT No.: PCT/CN2013/083113
§ 371 (c)(1),
(2) Date: Feb. 25, 2016

(87) PCT Pub. No.: WO2015/027535
PCT Pub. Date: Mar. 5, 2015

(65) Prior Publication Data
US 2016/0200864 A1    Jul. 14, 2016

(30) Foreign Application Priority Data

Aug. 30, 2013 (CN) .......................... 2013 1 0390107

(51) Int. Cl.
C08G 64/00 (2006.01)
C08G 64/14 (2006.01)
C08G 64/24 (2006.01)
C08G 63/02 (2006.01)

(52) U.S. Cl.
CPC ............. *C08G 64/14* (2013.01); *C08G 64/24* (2013.01)

(58) Field of Classification Search
CPC ............................ C08G 64/14; C08G 64/307
USPC .................................................. 528/196, 198
See application file for complete search history.

(56) References Cited

U.S. PATENT DOCUMENTS

| 5,104,964 A | 4/1992 | Kuze et al. |
| 5,243,018 A | 9/1993 | Kuze et al. |
| 2005/0020804 A1 | 1/2005 | Rohde et al. |
| 2009/0326149 A1 | 12/2009 | Schultz et al. |
| 2012/0253002 A1* | 10/2012 | Ozaki ................... C08G 64/14 528/204 |

FOREIGN PATENT DOCUMENTS

| CN | 1279698 A | 1/2001 |
| WO | 9114728 A1 | 10/1991 |
| WO | 9910406 A1 | 3/1999 |
| WO | 2005026234 A1 | 3/2005 |
| WO | 2011043484 A1 | 4/2011 |

OTHER PUBLICATIONS

International Search Report for Application No. PCT/CN2013/083113 dated Jun. 5, 2014.

* cited by examiner

*Primary Examiner* — Terressa Boykin
(74) *Attorney, Agent, or Firm* — Lerner, David, Littenberg, Krumholz & Mentlik, LLP

(57) ABSTRACT

The present invention relates to a method for preparing branched polycarbonate with a continuous two-phase interface phosgene method. Firstly, an aqueous solution of alkali metal hydroxide with triphenol and polyphenol dissolved therein reacts with a certain amount of phosgene in the present of inert organic solvent to prepare a prepolymer, and then a coupling reaction is performed among the prepolymer, an aqueous solution of alkali metal hydroxide with bisphenol and phosgene dissolved therein to finally obtain a polycarbonate resin. The method can avoid a cross-linking reaction, reduce the cost and improve the quality of the product, while improving the conversion ratio of the branching agent and the branching degree of the product.

20 Claims, No Drawings

METHOD FOR PREPARING BRANCHED POLYCARBONATE WITH CONTINUOUS TWO-PHASE INTERFACE PHOSGENE METHOD

CROSS REFERENCE TO RELATED APPLICATIONS

The present application is a national phase entry under 35 U.S.C. §371 of International Application No. PCT/CN2013/083113, filed Sep. 9, 2013, published in Chinese, which claims the benefit of Chinese Patent Application No. 201310390107.7, filed Aug. 30, 2013. The disclosures of said applications are incorporated by reference herein.

FIELD OF THE INVENTION

The present invention relates to a continuous process for preparing branched polycarbonate. Specifically, the present invention relates to a continuous two-phase interface phosgene method for preparing branched polycarbonate.

BACKGROUND OF THE INVENTION

Polycarbonate (PC) possesses many prominent properties such as impact resistance, heat resistance and high transmittance, etc., which is the second largest engineering plastic only next to nylon and PC has a wide variety of applications in the national economy. Due to the low melt tension, the conventional linear PC may lead to the phenomena such as the uneven thickness of the finished products and the contraction and the like during the process of its blow moulding, extrusion moulding and vacuo moulding. However, the branched PC can basically maintain the advantages of the linear PC and has better flowability, which is more suitable to be used in the situation requiring fine flowability to the polymer melt under higher rate of shear. Usually, adding one or more compound(s), which contain(s) three or more phenolic hydroxyl groups or acyl chloride groups, into the process of reaction can make the PC products have branched chain(s). The preparation process may be further divided into phosgenation interfacial method, melting transesterification method and reactive extrusion method, etc., wherein the most commonly used synthetic method is the phosgenation interfacial method.

Because of being affected by the cost and the stability in storage of raw materials, the polyphenolic compounds are preferred to be used as the branching agent in the industrialized production. According to the different process of adding branching agents, the conventional phosgenation interfacial method for preparing branched PC can be further divided into two kinds of processing routes, that is, one-step method and two-step method. One-step method is to prepare an aqueous solution of alkali metal hydroxide with the branching agent as well as bisphenol and then to react with phosgene. Two-step method is to react an alkali-metal-hydroxide aqueous solution of bisphenol with phosgene to prepare the oligomer firstly and then to add the branching agent to prepare high molecular weight branched PC. In the one-step method, obviously, there is a competing reaction between bisphenol/acyl chloride and branching agent/acyl chloride. In the two-step method, a large part of bisphenol has reacted with phosgene to form oligomer in the first step, but during the practical production, in order to control the molecular weight of the final product and ensure no residue of acyl chloride terminal group, it usually needs to control the conversion ratio of bisphenol below 99%, normally at 98~99%, while the addition of branching agent is only 0.1~2% (mol) of bisphenol, thus the competing reaction of bisphenol and branching agent with acyl chloride still cannot be avoided. Further, when under the same basic environment, the totally ionizing capability of branching agent is generally weaker than that of bisphenol, which results in bisphenol reacting with acyl chloride first and makes the conversion ratio of branching agent lower. In general, in order to improve the product's degree of branching and the conversion ratio, it is required to improve the addition amount of branching agent or the excessive ratio of phosgene, which may not only improve the cost of production, but also have a risk of conducting a crosslinking reaction and then reduce the quality of products.

WO9114728 discloses a technique of one-step method for feeding branching agent and bisphenol to prepare branched PC. In this technique, an aqueous phase of sodium phenolate is prepared with the branching agent THPE (1,1,1-tris(4-hydroxyphenyl)ethane) and BPA (bisphenol A), which is then reacted with phosgene in the existence of dichloromethane to produce branched polycarbonate oligomer, and at last the chain extension and end capping reactions are conducted to obtain the high molecular weight branched polycarbonate products. In this process, the conversion ratio of branching agent is relatively low, thus a higher addition of branching agent are required in order to obtain PC product with a high degree of branching, wherein the addition amount of THPE reaches 0.54 wt % of the total mass of BPA.

U.S. Pat. No. 5,104,964 provides a technique of one-step method for feeding branching agent and bisphenol to prepare branched PC. This process also makes the branching agent together with BPA form an aqueous phase of sodium phenolate, which is then reacted with phosgene in the existence of dichloromethane to produce oligomer emulsion. The aqueous phase is removed and then the oil phase of oligomer is obtained. The rest of dichloromethane, BPA, NaOH, PTBP (p-tert-butyl phenol) and TEA (triethylamine) are further added into the oligomer to conduct the chain extension and end capping reactions, and then the branched PC with high molecular weight is obtained. This process needs oil-water separation when preparing the oligomers, thereby increasing the reaction steps. Moreover, the interfacial tension of the oligomer emulsion is quite small, thus the practical process of separation is complicated.

US2009326149 also provides a technique of one-step method for feeding branching agent and bisphenol to prepare branched PC. In this technique, firstly, an oil-water two phases solution is prepared with BPA, dichloromethane, water, catalyst and NaOH etc., then a certain amount of THPE/NaOH solution is added into the oil-water two phases solution. Further phosgene is introduced step-by-step to prepare branched PC products. The pH value should be controlled at 8~10 in this process. Though this technique is simple, the conversion ratio of the branching agent is rather low and there is residue of acyl chloride terminal group at about 20 ppm, which critically affects the quality of the products.

US2005020804 discloses a method for preparing branched PC by optimizing the process of adding catalysts. In this technique, the branching agent is also added into sodium salt aqueous solution of the BPA to participate in the reaction. This method applies two-step process to feed catalyst, wherein the first coupling catalyst is specially controlled to be added when the molecular weight (Mw) of oligomer is 1400-1600, and the second coupling catalyst is added when the Mw is increased to 10000.

U.S. Pat. No. 5,243,018 provides a technique of preparing branched PC by two-step feeding the branching agent and bisphenol. In this preparation process, BPA and phosgene and the like are used to synthesize the oligomer first, then the branching agent, catalyst and end capping agent, etc. are added into the oligomer to carry out the copolymerization reaction for preparing branched PC. In order to ensure the higher degree of branching and the property of products, many kinds of branching agents are adopted in this process.

CN1279698 provides a technique for preparing branched PC by using tetra-atomic phenol as the branching agent. In this method, tetra-atomic phenol are firstly reacted with BPA, phosgene etc., then a certain amount of BPA is added to react in the existence of catalyst TEA for preparing the oligomer, finally the rest of BPA, TEA and end capping agent and the like are added to react by the chain extension and end capping reaction to obtain the high molecular weight branched PC. In this process, BPA is added in three steps, and the catalyst is added in two steps, thus the process of reaction is very complicated. Moreover, too early adding the catalyst may have the risk of conducting the crosslinking reaction.

Based on the above illustration, in the present techniques by interface phosgene methods for preparing branched PC, it usually adopts reacting the branching agent as well as bisphenol with phosgene at the same time or reacting the bisphenol with phosgene to prepare oligomer and then reacting with the branching agent. All similar processes can produce branched PC, but because of the competing reaction between branching agent/acyl chloride and bisphenol/acyl chloride and the characteristics (such as the totally ionizing capability of branching agent is weaker than that of bisphenol), the conversion ratio of branching agent becomes lower. In the prior art, there is still no method for preparing branched polycarbonate by using the branching agent to react with a certain amount of phosgene for preparing the structure of poly-chloroformate firstly, then to react with bisphenol and the rest of phosgene and the like.

SUMMARY OF THE INVENTION

An object of the present invention is to provide a continuous two-phase interface phosgene method for preparing branched polycarbonate by reacting polyphenolic branching agent with a certain amount of phosgene to prepare the structure of poly-chloroformate and then reacting with bisphenol and phosgene etc. to prepare branched polycarbonate. This method can convert the polyphenolic branching agent into the structure of poly-chloroformate in advance, thereby avoiding the competing reaction between the branching agent reacted with acyl chloride and bisphenol reacted with acyl chloride, thus the conversion ratio of branching agent and the branching degree of the product can be effectively improved while the crosslinking reaction can be avoided, which reduces the cost and improves the quality of the products.

In order to achieve the above object, the present invention provides the following method for preparing a branched polycarbonate, wherein the method includes the steps as follows:

a) Dissolving a branching agent into an aqueous solution of alkali metal hydroxide to form a first aqueous phase, then conducting a pre-reaction between the first aqueous phase and phosgene in the existence of an inert organic solvent to prepare the prepolymer; wherein the mole ratio of the phosgene to the phenolic hydroxyl group of the branching agent is from 0.1:1 to 2:1;

b) Dissolving a bisphenol into an aqueous solution of alkali metal hydroxide to form a second aqueous phase, then conducting the reaction among the prepolymer prepared by step a), the second aqueous phase and phosgene in the existence of an inert organic solvent to prepare a branched polycarbonate oligomer;

c) Adding an end capping agent and a catalyst into the oligomer prepared by step b) to carry out the chain extension and end capping reaction to obtain a solution of a high molecular weight branched polycarbonate, and finally obtaining the branched polycarbonate by purification and devolatilization.

In the pre-reaction of step a), the preferable mole ratio of the phosgene to the phenolic hydroxyl group of the branching agent is from 0.25:1 to 1:1. If the ratio of the phosgene to the functional group of the branching agent is relatively higher, the alkaline hydrolysis ratio of the phosgene will be improved; while if the ratio of the phosgene to the functional group of the branching agent is relatively lower, the conversion ratio of the branching agent will be decreased.

In the process of the pre-reaction of step a), the pH value of the aqueous phase should be maintained in the range of 12 to 14, preferably 12.8 to 13.5. If the pH value is relatively lower, the branching agent cannot be totally ionized and the conversion ratio of the branching agent will be affected; while if the pH value is relatively higher, the alkaline hydrolysis ratio of the phosgene will be improved.

A residence time of the pre-reaction in step a) is from 0.1 s to 10 s, preferably from 0.5 s to 2 s. The reaction temperature of step a) is below 40° C., preferably 25~35° C. If the residence time of the pre-reaction is relatively longer or the reaction temperature is relatively higher, those will lead to further reacting to prepare dipolymers, tripolymers and finally to form the crosslinked structure.

In the process of the reaction of step b), the pH value of the second aqueous phase should be maintained in the range of 10 to 13, preferably in the range of 12 to 12.8; the residence time of the reaction of step b) is in the range of 1 s to 20 min, preferably in the range of 1 s to 5 mins, further preferably from 2 s to 30 s. If the pH value in step b) is relatively lower, the bisphenol cannot be totally ionized, while if the pH value is relatively higher, the alkaline hydrolysis ratio of the phosgene will also be improved. If the residence time of the reaction is relatively longer, it will lead to a relatively higher polymerization degree of the oligomer, which will affect the control of the molecular weight of the finally product.

The branching agent mentioned in step a) is the compound comprising three or more phenolic hydroxyl groups, or the mixture thereof, such as: 1,1,1-tri(4-hydroxyphenyl) ethane, 1,3,5-trihydroxybenzene, 1,2,3-trihydroxybenzene, 4,6-dimethyl-2,4,6-tri(4-hydroxyphenyl) heptane, 1,1,2,2-tetra(4-hydroxyphenyl)ethane, 1,1,3,3-tetra(4-hydroxyphenyl)propane, 2,2,4,4,-tetra(4-hydroxyphenyl)pentane, 2,2,5,5-tetra(4-hydroxyphenyl)hexane, 1,1,2,2,-tetra (3-methyl-4-hydroxyphenyl)ethane and the like; preferably 1,1,1-tri(4-hydroxyphenyl)ethane. The aqueous solution of alkali metal hydroxide in step a) can be the aqueous solutions of sodium hydroxide, potassium hydroxide or the like, wherein that of sodium hydroxide is preferred. The concentration of the branching agent in the first aqueous phase is 3-25 wt %, preferably 8~20 wt %.

The bisphenol used in step b) can be bisphenol A (2,2-bis(4-hydroxyphenyl), tetrabromo bisphenol A or other dihydroxyl aromatic compounds or the mixture thereof, wherein the bisphenol A is preferable. The aqueous solution of alkali metal hydroxide in step b) can be the aqueous solutions of sodium hydroxide, potassium hydroxide or the like, wherein that of sodium hydroxide is preferred. In the second aqueous phase formed by the bisphenol and the aqueous solution of alkali metal hydroxide, the concentration of the bisphenol is 5~25 wt %, preferably 12~17 wt %.

The total mole amount of the phosgene in steps a) and b) is 1.03~1.2 times of the sum of the mole amounts of the branching agent and bisphenol, preferably 1.05~1.12 times.

The mole percentage of the branching agent is in the range of 0.1~2% of that of bisphenol is, preferably in the range of 0.2~0.8%.

In steps a) and b), the inert organic solvents can be one or more selected from dichloromethane, dichloroethane, trichloroethane, tetrachloroethane, toluene, chlorobenzene or carbon tetrachloride; wherein the dichloroethane is preferable. The concentration of phosgene in the inert organic solvent is 3~20 wt %, preferably 5~10 wt %.

In steps a), b) and c), the reactors used should contain at least a tubular mixed reactor (such as a static mixer or a tubular mixed reactor with circular flow) or at least a continuous stirred tank reactor or the combination thereof.

In step c), it is further required to add the end capping agent and the catalyst into the branched polycarbonate oligomer emulsion to carry out the chain extension and end capping reaction, and finally the branched PC products with high molecular weights are obtained. As for the end capping agent, it can be added at any stage before adding the catalyst or be added simultaneously together with the catalyst. The end capping can be phenol, tert-butylphenol, cumylphenol, octyl phenol or other phenolic-type substances. The catalyst can be chosen from the combination(s) of tertiary amine, quaternary amine salt such as triethylamine or such kind of ammonium salt with one or more kind(s) of phase transfer catalyst(s).

After the reaction is completed, the upper layer aqueous phase is separated and removed first. Then, dilute sodium hydroxide solution, dilute hydrochloric acid solution and desalted water are respectively used to rinse and separate the oil phase solution of the polymer, thereby eliminating the residue monomer, catalysts and inorganic salts or other impurities to obtain a purified polymer solution. Further, the multi-step flashing processing is used to improve the concentration of the polymer in the solution and finally the residual solvents are removed by using twin-screw extruder under a certain degree of vacuum and the branched polycarbonate resin is then granulated and obtained.

In the process of preparing the polycarbonate, the chloroformate group is mainly reacted with the phenolate ion through polycondensation reaction at the oil-water interface, and the phenolic hydroxyl group can participate in the reaction only after being ionized. The two stage ionization constants of BPA are 9.6 and 10.2, respectively. Therefore, if the pH value is too low, the extent of ionization of BPA will not be enough; while the pH value is too high, the hexahydrate of BPA will be precipitated. For example, in 16.5 wt % of BPA/NaOH aqueous solution at 25° C. with pH value of 12.5, more than 98% of BPA has been ionized to obtain divalent anions; when the pH value arrives at 13, the crystal of $Na_2BPA \cdot 6H_2O$ will appear and precipitate. The branching agent has three or more phenolic hydroxyl groups, its capability of totally ionization will be weaker than that of bisphenol under the same condition. Let's take THPE as an example, its three stage ionization constants are about 9.7, 10.4 and 11, respectively. In order to make more than 98% of THPE be totally ionized, the pH value should be improved above 12.8. In the conventional reaction processes, no matter forming a phenolate aqueous phase with both BPA and the branching agent or reacting BPA with phosgene first then adding the branching agent, in order to ensure the total ionization of BPA and none precipitation as well as less excessive ratio of phosgene, the pH value of the aqueous phase in the reaction process should be always maintained below 12.8. Hence, such requirements make the ionization degree of the branching agent in the reaction process relatively low, thereby finally rendering relatively low conversion ratio of the branching agent.

The present invention effectively avoids the competing reaction between the branching agent/acyl chloride and bisphenol/acyl chloride and improves the conversion ratio of the branching agent by means of reacting the branching agent directly with a certain amount of phosgene to obtain the chloroformate structure, followed by reacting with bisphenol and the rest formulating amount of phosgene to prepare high molecular weight branched PC. However, in the process of implementing the present invention, the over-reaction between the branching agent and the phosgene to form a three-dimensional network structure should be highly avoided, which means a risk of occurring crosslink reactions. Therefore, in order to ensure high conversion ratio of the branching agent with none crosslinking reaction, the feeding material ratio of the pre-reaction should be strictly controlled, the pH value of the aqueous phase should be maintained at 12~14, preferably 12.8~13.5 (too low pH value will result in failing to totally ionize of the branching agent, thereby affecting the conversion ratio of the branching agent; while too high pH value will result in the raise of the alkaline hydrolysis ratio of the phosgene); and the reaction temperature and the residence time of reaction etc. should also be controlled.

As for the literatures and patents in the prior art which have already disclosed the interface phosgene method for preparing branched polycarbonate, there is no report about pre-reacting the branching agent directly with phosgene and then conducting chain extension and end capping reaction. If such a process is adopted, the conversion ratio of the branching agent can be improved to above 98.5% while the excessive ratio of phosgene is below 10%, and meanwhile such a process avoids the crosslinking reaction and obtains high-qualified branched polycarbonate.

DETAILED DESCRIPTION OF THE INVENTION

The following examples will further illustrate the methods provided by the present invention, but the present invention is not limited to the listed examples. The present invention also includes any publicly-known alteration within the claimed protection scope.

The materials used in the following examples are as below, respectively:

Bisphenol A: technical grade, purchased from Mitsui Chemicals; THPE: purchased from Tokyo Chemical Industry Co., Ltd.; p-tert-butyl phenol: AR, purchased from Japan Ink Chemical Industry Co., Ltd.; sodium hydroxide: AR, purchased from Tianjin Municipality Kemi'ou Chemical Reagent Co. Ltd.; phosgene: technical grade, self-made; dichloromethane: AR, purchased from Tianjin Municipality Kemi'ou Chemical Reagent Co. Ltd.; triethylamine: AR, purchased from Tianjin Municipality Kemi'ou Chemical Reagent Co. Ltd.

High performance liquid chromatography is applied to analyze the amounts of BPA and THPE remaining in the aqueous phase at 280 nm.

Gel permeation chromatography is adopted to determine the molecular weight and analyze its distribution at 254 nm. The degree of molecular weight distribution is an index of judging the branching degree of the product. The broader the molecular weight distribution is, the higher the branching degree is. The molecular weight distribution of linear PC is about 2.1.

The granules of the final product is dried for 4 hours at 120° C., followed by manufactured into PC thin film with a thickness of 0.2 mm via POTOP® F-MSU-25/30 tape casting machine. Judging the crosslinking scale of the product by calculating the average amount of fisheyes having the diameter >100 μm on the area of 10×200 cm, and more fisheyes mean more critical crosslinking of the products.

EXAMPLE 1

THPE, sodium hydroxide and water were mixed and dissolved to form a sodium salt aqueous solution of THPE (i.e., the first aqueous phase), wherein the concentration of THPE was 10 wt %, pH=13.1. BPA, sodium hydroxide and water were mixed and dissolved to form a sodium salt aqueous solution of BPA (i.e., the second aqueous phase), wherein the concentration of BPA was 16 wt %, pH=12.5. Phosgene was dissolved into dichloromethane to form an organic phase, wherein the concentration of phosgene was 6 wt %. The first aqueous phase and the above organic phase were drived into a pre-reactor composed of static mixer at the flow rates of 5.0 kg/hr and 4.0 kg/hr, respectively; wherein the inner diameter of the reactor was 7 mm, the length thereof was 75 mm, the residence time was about 1 s, and the outlet temperature of the reaction was controlled at 31° C. Once the pre-reaction was finished, the reactants were immediately induced into a phosgenation reactor composed of a series of static mixers, and at the same time the second aqueous phase, phosgene and dichloromethane were added therein at the flow rates of 660 kg/hr, 50.3 kg/hr and 578 kg/hr, respectively. Wherein the inner diameter of the reactor was 54 mm, the length thereof was 650 mm, the residence time was about 5 s, and the outlet temperature of the reaction was controlled at 35° C. Once the phosgenation reaction was finished, the reactants were immediately induced into a series of stirred tank reactors with two in series, and 5 wt % of end capping agent p-tert-butyl phenol/dichloromethane solution, 32 wt % of sodium hydroxide solution and 1.5 wt % of catalyst triethylamine/dichloromethane solution were added into the first reaction still at the flow rates of 41.7 kg/hr, 17.0 kg/hr and 9.3 kg/hr, respectively; wherein the effective volumes of the reaction stills were 100 L and 600 L, respectively. After the reaction was completed, the oil-water two phases were introduced into the inclined plate separator and separated to obtain the upper aqueous phase and the lower oil phase, then the lower oil phase was rinsed successively by 0.25 wt % NaOH, 0.4 wt % HCl and desalted water have a conductivity <0.2 μs/cm; wherein the flow rates of the washings were all 100 kg/hr. Further, a two-stage flashing was adopted to improve the concentration of polymer until over 80%. The operating conditions of the first flashing were as follows: the inlet pressure was 2 MPa (G) and the temperature therein was 160° C.; the pressure in the flash tank was 0.4 MPa (G) and the temperature therein was 95° C. The operating conditions of the second flashing were as follows: the inlet pressure was 7 MPa (G) and the temperature therein was 280° C.; the pressure in the flash tank was 1 MPa (G) and the temperature therein was 240° C. Finally, the high temperature solution was directed into Coperion ZSK26 twin-screw extruder to remove the remaining dichloromethane at the vacuum degree of 100 mbar and then the remainder was extruded and granulated to obtain the branched polycarbonate product.

At last, in the upper aqueous phase separated and obtained by the inclined plate separator, the BPA residue was 2.1 g/L, the THPE residue was 6 mg/L, the weight-average molecular weight of the product were 33730 g/mol, the molecular weight distribution was 3, and the average amount of fisheyes on the thin film finished product was 3 (10×200 cm).

EXAMPLE 2

Referring to the operating conditions mentioned in example 1, the feeding amount of the ingredient base in the first aqueous phase was decreased, and the pH value of the sodium salt aqueous solution of the THPE was reduced to 12.8, wherein the sodium salt aqueous solution was formed by mixing and dissolving THPE, sodium hydroxide and water. Other operating conditions remained unchanged. In the final aqueous phase, the BPA residue was 2.4 g/L, the THPE residue was 13 mg/L, the weight-average molecular weight of the product was 31740 g/mol, the molecular weight distribution was 2.8, and the average amount of fisheyes on the thin film finished product was 5 (10×200 cm).

EXAMPLE 3

Referring to the operating conditions mentioned in example 1, i the feeding amount of the ingredient base in the first aqueous phase was increased, and the pH value of the sodium salt aqueous solution of the THPE to 13.5, wherein the sodium salt aqueous solution was formed by mixing and dissolving THPE, sodium hydroxide and water. Other operating conditions remained unchanged. In the final aqueous phase, the BPA residue was 3.1 g/L, the THPE residue was 9 mg/L, the weight-average molecular weight of the product was 32680 g/mol, the molecular weight distribution was 2.9, and the average amount of fisheyes on the thin film finished product was 6 (10×200 cm).

EXAMPLE 4

Referring to the operating conditions mentioned in example 1, a static mixer with 7 mm of inner diameter and 75 mm of length was added in the pre-reaction stage, and the residence time of reaction is prolonged to about 2 s. Other operating conditions remained unchanged. In the final aqueous phase, the BPA residue was 2.9 g/L, the THPE residue was 5 mg/L, the weight-average molecular weight of the product was 34350 g/mol, the molecular weight distribution was 3.1, and the average amount of fisheyes on the thin film finished product was 9 (10×200 cm).

EXAMPLE 5

Referring to the operating conditions mentioned in example 1, the outlet temperature of the pre-reactor was improved to 35° C. Other operating conditions remained unchanged. In the final aqueous phase, the BPA residue was 3.0 g/L, the THPE residue was 6 mg/L, the weight-average molecular weight of the product was 34140 g/mol, the molecular weight distribution was 3.1, and the average amount of fisheyes on the thin film finished product was 11 (10×200 cm).

EXAMPLE 6

Referring to the operating conditions mentioned in example 1, the outlet temperature of the pre-reactor is decreased to 25° C. Other operating conditions remained unchanged. In the final aqueous phase, the BPA residue was 2.8 g/L, the THPE residue was 18 mg/L, the weight-average molecular weight of the product was 31870 g/mol, the molecular weight distribution was 2.8, and the average amount of fisheyes on the thin film finished product was 4 (10×200 cm).

EXAMPLE 7

Referring to the operating conditions mentioned in example 1, the flow rate of the organic phase in the pre-reaction was improved from 4.0 kg/hr of example 1 to 8.0 kg/hr, the flow rate of phosgene in the phosgenation reaction was reduced from 50.3 kg/hr of example 1 to 50.0 kg/hr, and the feeding amount of phosgene in the process of the pre-reaction was improved. The excessive ratio of total phosgene and other operating conditions remained unchanged. In the final aqueous phase, the BPA residue was 3.6 g/L, the THPE residue was 6 mg/L, the weight-average molecular weight of the product was 34560 g/mol, the molecular weight distribution was 3.1, and the average amount of fisheyes on the thin film finished product was 13 (10×200 cm).

EXAMPLE 8

Referring to the operating conditions mentioned in example 1, the flow rate of the organic phase in the pre-reaction was reduced from 4.0 kg/hr of example 1 to 2.0 kg/hr, the flow rate of phosgene in the phosgenation reaction was improved from 50.3 kg/hr of example 1 to 50.4 kg/hr, and the feeding amount of phosgene in the process of the pre-reaction was reduced. The excessive ratio of total phosgene and other operating conditions remained unchanged. In the final aqueous phase, the BPA residue was 2.4 g/L, the THPE residue was 16 mg/L, the weight-average molecular weight of the product was 31940 g/mol, the molecular weight distribution was 2.8, and the average amount of fisheyes on the thin film finished product was 6 (10×200 cm).

EXAMPLE 9

Referring to the operating conditions mentioned in example 1, the flow rates of the first aqueous phase and the organic phase in the pre-reaction were improved to 11.3 kg/hr and 9.2 kg/hr, respectively; and the flow rate of end capping agent p-tert-butyl phenol/dichloromethane solution was improved from 5 wt % of example 1 to 43.1 kg/hr. Other operating conditions remained unchanged. In the final aqueous phase, the BPA residue was 2.4 g/L, the THPE residue was 9 mg/L, the weight-average molecular weight of the product was 33950 g/mol, the molecular weight distribution was 3.9, and the PC product with high branching degree was obtained. The average amount of fisheyes on the thin film finished product was 11 (10×200 cm).

EXAMPLE 10

Referring to the operating conditions mentioned in example 1, the flow rates of the phosgene and dichloromethane in the phosgenation reaction were reduced to 48.5 kg/hr and 557.4 kg/hr, respectively; and the mole ratio of the total amount of the phosgene to the sum of the branching agent and the bisphenol was reduced to 1.06:1. Other operating conditions remained unchanged. In the final aqueous phase, the BPA residue was 3.6 g/L, the THPE residue was 7 mg/L, the weight-average molecular weight of the product was 31460 g/mol, the molecular weight distribution was 3.2, and the PC product with high branching degree was obtained. The average amount of fisheyes on the thin film finished product was 9 (10×200 cm).

Comparative Example 1

Referring to the operating conditions mentioned in example 1, the feeding amount of the ingredient base in the first aqueous phase was decreased, and the pH value of the sodium salt aqueous solution of THPE was reduced to 11.9, wherein the sodium salt aqueous solution was formed by mixing and dissolving THPE, sodium hydroxide and water. Other operating conditions remained unchanged. In the final aqueous phase, the BPA residue was 2.7 g/L, the THPE residue was 34 mg/L, the weight-average molecular weight of the product was 30370 g/mol, the molecular weight distribution was 2.6, and the average amount of fisheyes on the thin film finished product was 7 (10×200 cm).

Compared with the examples of the present invention, reducing the pH value to below 12 would not make the branching agent ionized enough, thereby rendering the residual amount of the branching agent in the final aqueous phase high and the conversion ratio relatively low.

Comparative Example 2

Referring to the operating conditions mentioned in example 1, a static mixer with 7 mm of inner diameter and 750 mm of length was added in the pre-reaction stage, and the residence time of reaction was prolonged to about 11 s. Other operating conditions remained unchanged. In the final aqueous phase, the BPA residue was 2.9 g/L, the THPE residue was 5 mg/L, the weight-average molecular weight of the product was 35870 g/mol, the molecular weight distribution was 3.3, and the average amount of fisheyes on the thin film finished product was 36 (10×200 cm).

Compared with the examples of the present invention, prolonging the residence time of pre-reaction to above 10 s would make poly-chloroformate further polymerize to form a network structure, and partially crosslinked in the subsequent chain extension reaction, thereby affecting the property of the product.

Comparative Example 3

BPA, THPE, sodium hydroxide and water was mixed and dissolved to form their sodium salt aqueous solution, wherein the concentration of BPA was 16 wt %, the concentration of THPE was 0.08 wt %, pH=12.5. the reactants were drived into a phosgenation reactor composed of a set of static mixers at the flow rates of 660 kg/hr, 50.6 kg/hr and 582 kg/hr, respectively; and conducting the phosgenation reaction; wherein the inner diameter of the reactor was 54 mm, the length thereof was 650 mm, the residence time was about 5 s, and the outlet temperature of the reaction was controlled at 35° C. Once the phosgenation reaction was finished, the reactants were immediately induced into a series of stirred tank reactors with two in series, and 5 wt % of end capping agent p-tert-butyl phenol/dichloromethane solution, 32 wt % of sodium hydroxide solution and 1.5 wt % of catalyst triethylamine/dichloromethane solution were added into the first reaction still at the flow rates of 41.7 kg/hr, 17.0 kg/hr and 9.3 kg/hr, respectively; Wherein the effective volumes of the reaction stills were 100 L and 600 L, respectively. After separating and purifying the reaction products and removing the organic solvents, the branched polycarbonate product was obtained. In the final aqueous phase, the BPA residue was 3.1 g/L, the THPE residue was 63 mg/L, the weight-average molecular weight of the product was 28940 g/mol, the molecular weight distribution was 2.5, and the average amount of fisheyes on the thin film finished product was 11 (10×200 cm).

Compared with the examples of the present invention, the process of feeding in one-step cannot avoid the competing reaction between the branching agent and BPA, thereby rendering the residual amount of branching agent to be obviously enhanced and the conversion ratio to be relatively low.

The person skilled in the art may understand that, based on the teachings of the present description, some modifications or amendments can be conducted to the present invention. These modifications and amendments should also be within the scope defined by the claims of the present invention.

The invention claimed is:

1. A method for preparing a branched polycarbonate via a continuous two-phase phosgenation interfacial process, comprising the steps of:
   a) dissolving a branching agent into an aqueous solution of alkali metal hydroxide to form a first aqueous phase, then conducting a pre-reaction between the first aqueous phase and phosgene in the existence of an inert organic solvent to prepare a prepolymer; wherein the mole ratio of the phosgene to the phenolic hydroxyl group of the branching agent is from 0.1:1 to 2:1;
   b) dissolving a bisphenol into an aqueous solution of alkali metal hydroxide to form a second aqueous phase, then conducting a reaction among the prepolymer prepared by step a), the second aqueous phase and phosgene in the existence of an inert organic solvent to prepare a branched polycarbonate oligomer; and
   c) adding an end capping agent and a catalyst into the oligomer prepared by step b) to carry out the chain extension and end capping reaction to obtain a solution of a high molecular weight branched polycarbonate, and finally obtaining the branched polycarbonate by separating and purifying.

2. The method according to claim 1, in the pre-reaction of step a), the pH value of the first aqueous phase is maintained in the range of 12 to 14.

3. The method according to claim 1, wherein, a residence time of the pre-reaction of step a) is in the range of 0.1 s to 10 s.

4. The method according to claim 1, in the pre-reaction of step a), the reaction temperature is below 40° C.

5. The method according to claim 1, wherein the branching agent of step a) is a compound comprising three or more phenolic hydroxyl groups, or the combination thereof; and the concentration of the branching agent in the first aqueous phase is from 3 wt % to 25 wt %.

6. The method according to claim 1, in the reaction of step b), the pH value of the second aqueous phase is maintained in the range of 10 to 13.

7. The method according to claim 1, wherein a residence time of the reaction of step b) is in the range of 1 s to 20 mins.

8. The method according to claim 1, in step b), the bisphenol is bisphenol A or tetrabromo bisphenol A; the concentration of the bisphenol in the second aqueous phase is from 5 wt % to 25 wt %.

9. The method according to claim 1, wherein the total mole amount of the phosgene in steps a) and b) is in the range of 1.03 times to 1.2 times of the sum of the mole amounts of the branching agent and the bisphenol.

10. The method according to claim 1, wherein the mole percentage of the branching agent in step a) is in the range of 0.1% to 2% of the mole percentage of the bisphenol in step b).

11. The method according to claim 1, in steps a) and b), the inert organic solvent can be one or more of dichloromethane, dichloroethane, trichloroethane, tetrachloroethane, toluene, chlorobenzene or carbon tetrachloride; and the concentration of the phosgene in the inert organic solvent is from 3 wt % to 20 wt %.

12. The method according to claim 1, wherein in the pre-reaction of step a), the mole ratio of the phosgene to the phenolic hydroxyl group of the branching agent is from 0.25:1 to 1:1.

13. The method according to claim 2, wherein in the pre-reaction of step a), the pH value of the first aqueous phase is maintained in the range of 12.8 to 13.5.

14. The method according to claim 3, wherein the residence time of the pre-reaction of step a) is in the range of 0.5 s to 2 s.

15. The method according to claim 5, wherein the branching agent of step a) is one or more of 1,1,1-tri(4-hydroxyphenyl)ethane, 1,3,5-trihydroxybenzene, 1,2,3-trihydroxybenzene, 4,6-dimethyl-2,4,6-tri(4-hydroxyphenyl)heptane, 1,1,2,2-tetra(4-hydroxyphenyl)ethane, 1,1,3,3-tetra(4-hydroxyphenyl)propane, 2,2,4,4,-tetra(4-hydroxyphenyl)pentane, 2,2,5,5-tetra(4-hydroxyphenyl)hexane or 1,1,2,2,-tetra (3-methyl-4-hydroxyphenyl)ethane; and the concentration of the branching agent in the first aqueous phase is from 8 wt % to 20 wt %.

16. The method according to claim 15, wherein the branching agent of step a) is 1,1,1-tri(4-hydroxyphenyl) ethane.

17. The method according to claim 6, wherein in the reaction of step b), the pH value of the second aqueous phase is maintained in the range of 12 to 12.8.

18. The method according to claim 7, wherein the residence time of the reaction of step b) is in the range of 1 s to 5 mins.

19. The method according to claim 9, wherein the total mole amount of the phosgene in steps a) and b) is in the range of 1.05 times to 1.12 times of the sum of the mole amounts of the branching agent and the bisphenol.

20. The method according to claim 10, wherein the mole percentage of the branching agent in step a) is in the range of 0.2% to 0.8% of the mole percentage of the bisphenol in step b).

* * * * *